United States Patent [19]

Lambicco

[11] 4,280,604
[45] Jul. 28, 1981

[54] SERVO-ARRANGEMENT WITH AN ELECTRIC GEAR SHIFT DISPOSITION FOR THE HAND, RESPECTIVELY AUTOMATIC CONTROL OF A GEAR CHANGE, BY ELIMINATION OF THE CLUTCH PEDAL

[76] Inventor: Rocco Lambicco, Via Napoli, 84, Sora (Frosinone), Italy

[21] Appl. No.: 37,329

[22] Filed: May 9, 1979

[30] Foreign Application Priority Data

Aug. 17, 1978 [IT]  Italy ............................... 50767 A/78

[51] Int. Cl.³ ............................................ B60K 41/28
[52] U.S. Cl. ................................ 192/0.08; 192/0.092; 192/3.58; 74/866
[58] Field of Search ................... 192/0.08, 0.092, 0.04, 192/0.052, 0.03, 0.033, 3.58; 74/337.5, 866

[56] References Cited

U.S. PATENT DOCUMENTS

| | | | |
|---|---|---|---|
| 2,924,111 | 2/1960 | Backus et al. | 192/3.58 |
| 3,570,636 | 3/1971 | Franz et al. | 74/337.5 |
| 3,628,642 | 12/1971 | Ravenel | 192/3.58 |

*Primary Examiner*—George H. Krizmanich
*Attorney, Agent, or Firm*—McAulay, Fields, Fisher, Goldstein & Nissen

[57] ABSTRACT

A servo-arrangement for automatically controlling a transmission having an override control to provide for automatic or manual control of the transmission, the servo-arrangement including a rod unit provided with electrode units thereon, the rod unit containing various contoured surfaces for controlling the movement of sliding bars which are connected to different gears and controls in the transmission in order to effect fully automatic control for the transmission or a manual override to control the transmission manually, and a selector switch for decoupling and coupling an electronic device for automatic control.

16 Claims, 8 Drawing Figures

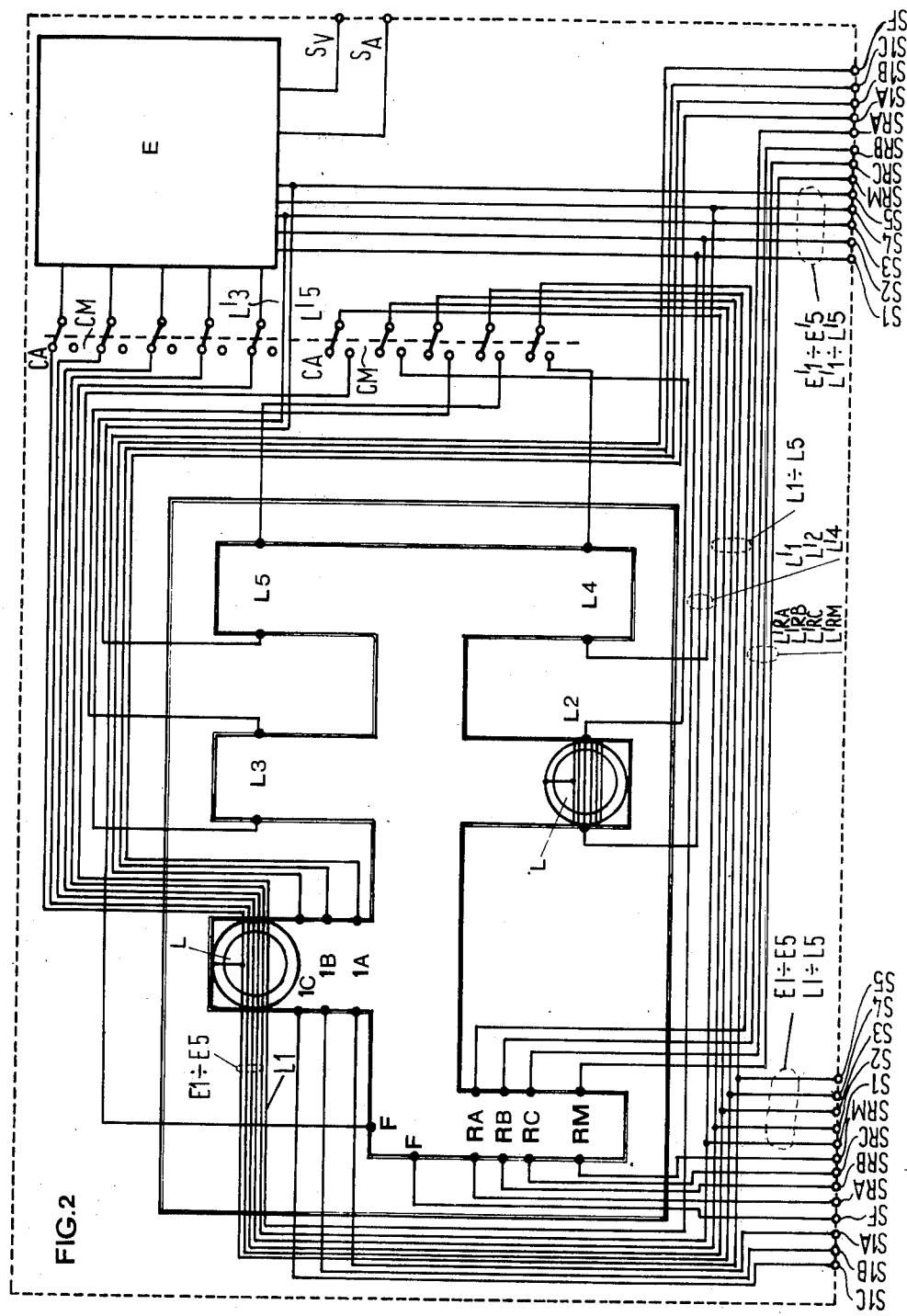

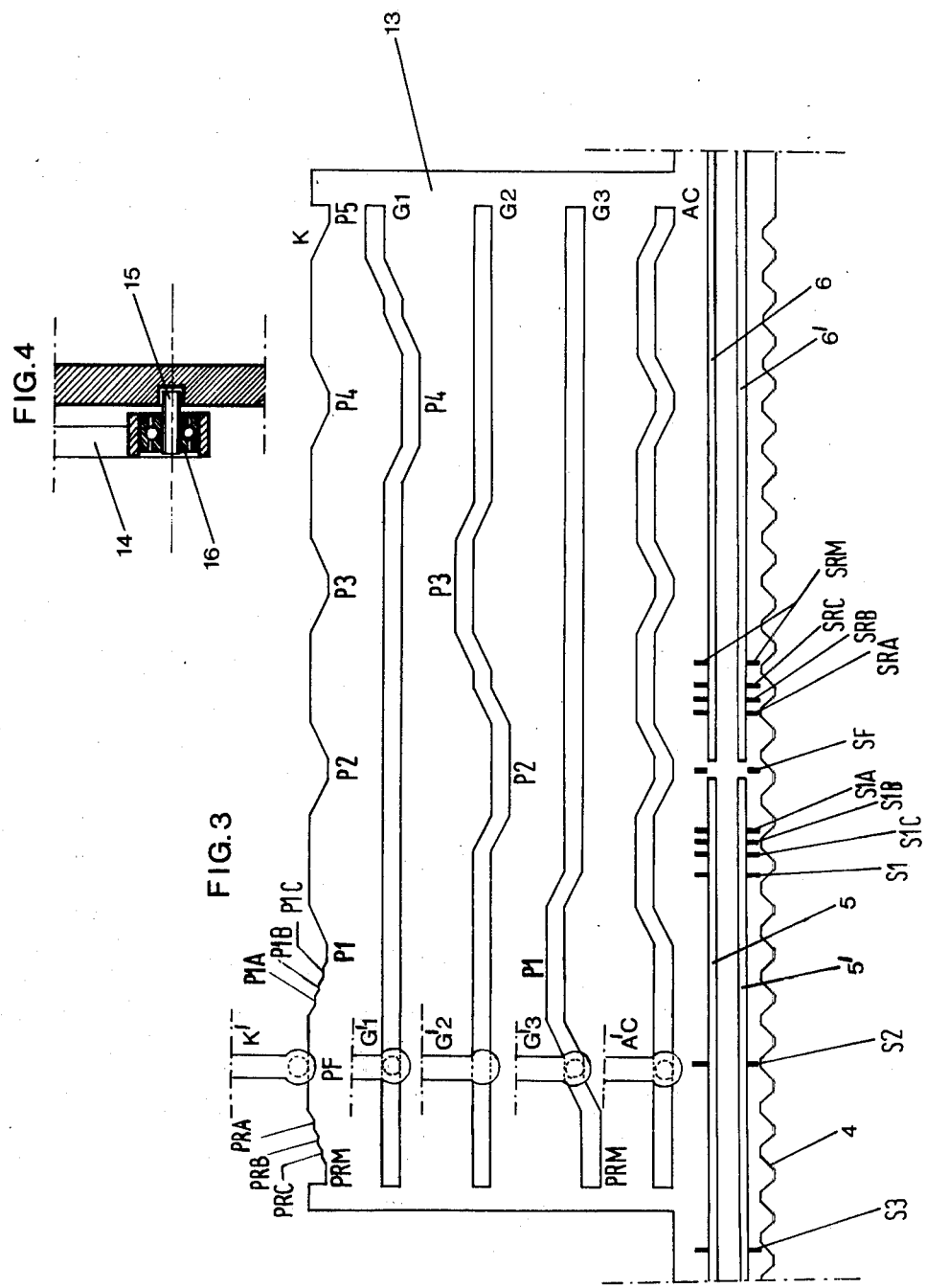

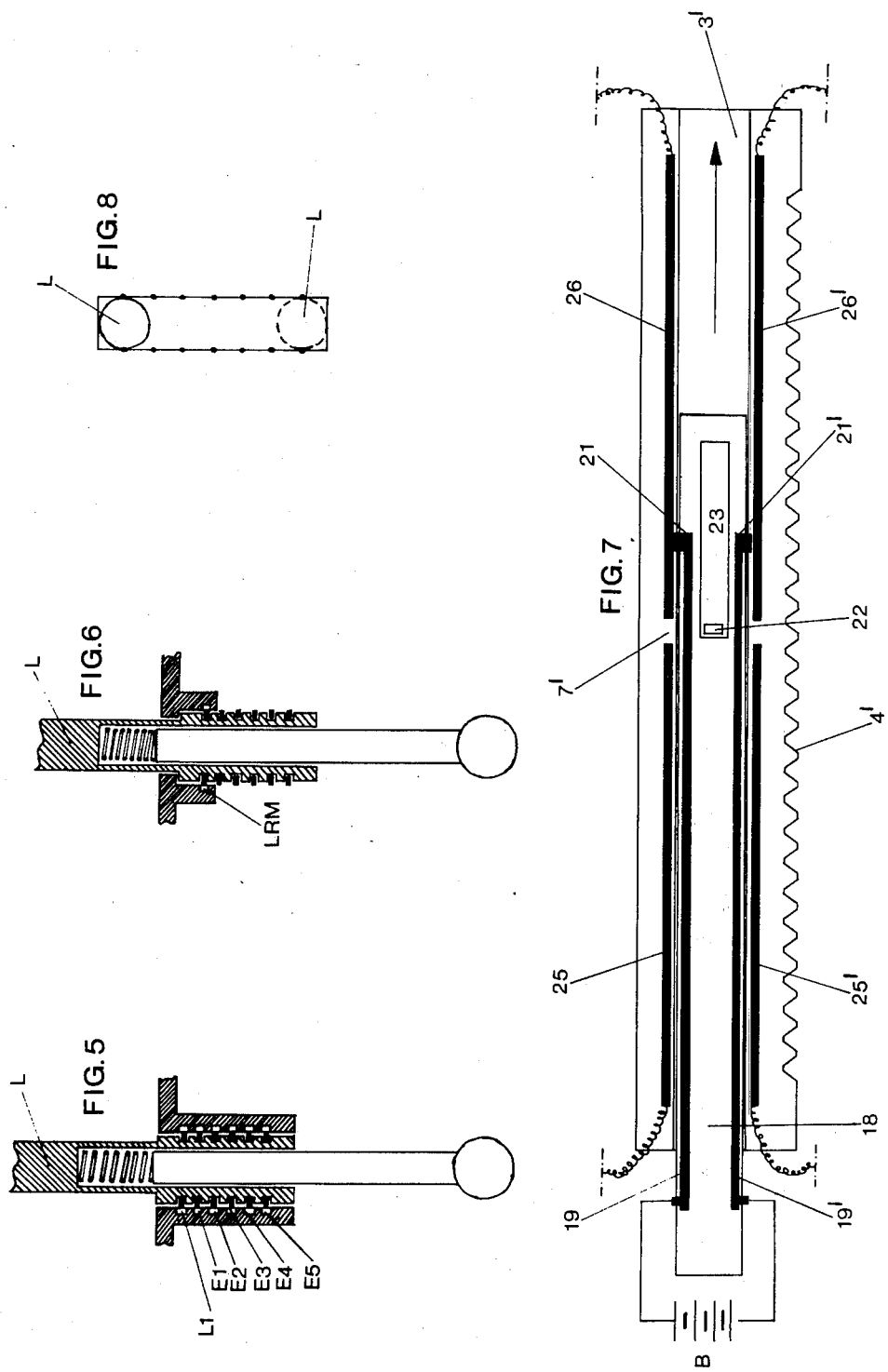

SERVO-ARRANGEMENT WITH AN ELECTRIC GEAR SHIFT DISPOSITION FOR THE HAND, RESPECTIVELY AUTOMATIC CONTROL OF A GEAR CHANGE, BY ELIMINATION OF THE CLUTCH PEDAL

The present invention concerns a servo-arrangement provided with an electric gear shift disposition for the automatic control of a gear change by elimination of the clutch pedal, wherein by simple actioning of an electric switch a hand or manual override control may be inserted.

In the already well known automatic gear shifts the use of the clutch pedal is not necessary. The gear change must be accomplished in a different way with respect to the conventional hand controlled changes, so to assure the cooperation with the electronic device serving for the selection of the speeds, whereby said device receives the informations about the speed changes through appropriate feelers.

The need to use a completely new gear change in the case of such gear shifts is the real reason for important disadvantages. Furthermore, no possibility is given to the driver to use the clutch lever for the direct gear shift, as said gear shifts are bound to an automatic control, so that the driver, moreover, does not have any sportive attractiveness.

However, the bigger disadvantages consist in that for the new disposition of the new gear change many specific features of the conventional hand operated gear change do not exist.

In the automatic gear shifts known until now, e.g., a great energy dissipation, and consequently a great fuel waste has been noted; the acceleration is slower; lower maximum speeds are reached. Furthermore, the braking action of the motor can be utilized only in part and thanks to particular measures. This causes a big wear of the breakes.

Finally, said automatic gear shifts can not be applied to heavy trucks or buses, because said gear shifts can work only within determined capacity limits (200+250 Hp). This means that such a gear shift disposition can not be applied just to to those vehicles where said gear shifts could represent the biggest advatages for the driver.

It is therefore a purpose of the present invention to provide a servo-arrangement so as to eliminate all the disadvantages of the automatic gear shifts known until now, maintaining all the advantages of the hand operated gear change, whereby the driver has the opportunity, at any time, to drive the vehicle automatically or by hand, and whereby, furthermore, the possibility is assured to make use, also in the case of heavy trucks or buses, of a completely automatic gear shift.

The main principle of the present invention starts from the point of view to realize a servo-arrangement in cooperation with a conventional, hand operated gear change, wherein the driver may, at any time, control the vehicle by manually hand or completely automatically. Furthermore, the main principle of the present invention starts from the principle that all the advantages of a conventional gear change are to be retained and all the disadvantages are to be eliminated.

Therefore, the present invention starts from the premise that the vehicle is provided with a gear change of the conventional kind and that the clutch pedal is either not present at all or cut off.

It is well known that in the conventional hand operated gear changes, the speeds are connected by means of the relative operation of three gear wheels fixed against torsion of the driving shaft, but movable thereon in the longitudinal direction thereof. Said movable gear wheels can insert respectively the reverse gear and the first speed; the second and the third speed; the fourth and the fifth speed. According to the present invention, the servo-arrangement acts substantially onto said movable gear wheels.

Furthermore, according to the present invention, it is possible to act on said gear wheels either by means of the clutch lever (hand operation) or by inserting the already well known electronic device (automatic operation).

The present invention provides a servo-arrangement working in cooperation with an electronic device, and with a clutch lever, which is mechanically connected to a conventional gear change, substantially consisting in:

a rod out of any, but resistant material, with a rectangular section, the lower side thereof having a toothed section, and on the upper side of which a rectangular plate, out of one piece with said rod, respectively tightly connected with the same, out of any, but resistant material is provided, the longitudinal axis thereof being parallel to the longitudinal axis of said rod, and the length thereof being nearly the same of the length of the rod;

two electrodes in the form of a stick placed on said rod in a longitudinal, coupled position and insulated from said rod, a small slit being provided at both opposite ends;

a contour line being predetermined in the shape thereof and being inserted in the upper edge of the plate, as well as in four grooves, performed on said plate and being parallel to the contour line of the upper edge, said grooves being also predetermined in the shape thereof;

a bar sliding, by means of a small roller, in the shape of predetermined contour line, said bar being cut in the upper edge of said plate, as well as in four bars, sliding in the relative grooves by means of the relative small rollers, said bars being respectively mechanically connected with the clutch, with the three movable gear wheels of the gear change and with the accelerator-control-rods;

an electromotor provided with a reduction gear and with a gear wheel, wherein said gear wheel is in contact with said toothed section of said rod, and wherein the terminals of said electromotor are connected, after polarity reversal, to the electrodes of each electrode couple of said rod;

a plurality of electric contacts being fixed with respect to the rod, said contacts being placed along one side of the relative electrode, said contacts serving to establish, together with the relative electrodes, a sliding contact.

The electronic device as well as the clutch lever are connected to the servo-arrangement by means of a gear shift provided by the present invention, substantially consisting in:

an already well known electronic device, said device receiving, by means of feelers connected to said device by means of conductions, shifting informations about the different positions of the accelerator pedal as well as about the speed variations of the vehicle;

five electric conductions corresponding to the relative speeds, conductors or conductions starting from the electronic device and being connected to a shift position of the clutch, wherein said clutch determines, in said position, the driving direction "forward", and wherein the conductors or conductions are conducted up to five corresponding sliding contacts of the servo-arrangement and are connected to one of these sliding contacts;

five electric conductors or conductions corresponding to the relative speeds, the conductors always starting from the five clutch positions, and are also connected to one of the relative sliding contacts, wherein the clutch position corresponding to the first speed corresponds to the general position "forward", and in this position the clutch is placed at the servo-arrangement to pass on the informations obtained from the electronic device by means of the conductors above and the clutch is separately connected to said servo-arrangement;

eight electric conductors or conductions producing, between said clutch and the servo-arrangement, an electric connection, in both cases being the control of the gear change performed by hand or automatically, and said conductors or conductions are grouped as follows:

four conductors or conductions starting from the relative gradual reverse gear positions of said clutch, and connecting said reverse gear positions to corresponding sliding contacts of the servo-arrangement;

three conductors or conductions starting from the relative gradual positions of said clutch for the insertion of the first speed by hand operation, and connecting the same to corresponding sliding contacts of the servo-arrangement;

one selection switch with two positions, to which the conductors are connected in such a way that, according to switching over to the automatic control, respectively to the hand control, the gear change may be operated automatically by electronic device, by means of the conductors, and respectively by hand, by means of the conductors.

The servo-arrangement according to the present invention is provided nearby the gear change, at a place which can be choosen for each kind of vehicle. Said arrangement consists essentially in a rod out of any resistant material, with a rectangular section, having at the lower side thereof a toothed section; a rectangular plate is provided, vertical to the upper side of the rod and out of one piece therewith, eventually fixed thereto, the longitudinal axis thereof being parallel with the longitudinal axis of said rod, said plate being about half the length of the rod. Two stick-like electrode couples are fixed, in an adjacent position and in the longitudinal direction of the rod, thereon, said couples consisting respectively in an upper and a lower electrode. Between the opposite ends of both electrode couples an air slit is provided. The electrodes are electrically insulated from the rod.

An electromotor is provided underneath the rod, said motor being provided with a reduction gear and with a gear wheel being engaged with the toothed rack section of the rod.

The outer ends of the stick-like electrodes are connected, under reverse polarity, in such a way to the terminals of the electromotor that an upper, respectively a lower electrode of an opposite electrode couple is connected to the same terminal of the electromotor. Along one side of the opposite electrodes are provided as many brush pairs as sliding contacts as are the electric conductions, which lead to the speeds, respectively to the speed positions of the clutch lever (five), as well as to the idle gear (one), to the four positions for the gradual insertion of the reverse gear (four) and to the three positions for the gradual insertion of the first speed (three) (hand operation).

Therefore, thirteen brush contacts are applied, at a support independant from the rod, in such a way that the stick-like electrodes and the brush contacts form, in a relative movement, respectively corresponding sliding contacts.

One terminal of the brush contacts provided for the five speeds is respectively connected to the start position of the corresponding "forward" clutch lever position (automatic operation).

One terminal for the same brush contacts provided for the five speeds is equally connected to the start position of the corresponding five clutch lever positions (hand operation), while separate conductions connect the relative clutch positions of the clutch lever to the corresponding terminals of the selection switch, whereby the clutch position for the first speed (hand operation) corresponds to clutch lever position "forward" (automatic operation), but is separately connected to the same brush contact.

One terminal of the relative brush contacts provided for the gradual position of the first speed (respectively forward position), is respectively connected to the start position of the corresponding clutch lever position.

One terminal of the relative brush contact provided for the three gradual positions of the reverse gear is respectively connected to the start position of the corresponding clutch lever position.

One terminal of the relative brush contacts provided for the idle gear is respectively connected to the start position of the corresponding clutch lever position.

The return circuits of the five brush contacts for the corresponding speeds are connected as follows: five conductions lead back to the electronic device; five separate conductions lead back to the relative terminals of the selection switch. The return circuits of the three gradual positions of the first speed, as well as the return circuits of the four brush contacts for the four gradual positions of the reverse gear and the return circuits of the brush contact for the idle gear lead back, respectively from the relative terminal to the corresponding clutch lever position.

The rectangular plate, out of one piece with the rod or fixed to the same, vertical to the same, and the longitudinal axis of the rod, shows a contour line cut in the upper edge thereof, the shape of said contour line being predetermined, as well as four grooves performed in said plate being parallel to said contour line and the shape thereof being equally predetermined. The contour line as well as the four grooves show a first section, parallel to the longitudinal axis of said plate, said sections going over into sections—being still parallel—but upwardly or downwardly turned, and being of different length. The contour line and the four grooves receive respectively sliding bars; said sliding bars show, at one end thereof, a small roller being slidingly placed in the contour line, respectively in the grooves. These sliding bars are connected, at the other end thereof, through relative levers and articulations, to the clutch, to the three movable gear wheels of the gear change and to the accelerator control rods. The sections of the contour lines, respectively of the four grooves, different in the length thereof, parallel and respectevely shifted, correspond to one connection, respectively disconnection position of the gear change, to the four speeds, respectively to the reverse gear, respectively to the idle gear.

As soon as the plate, fixed to the toothed rod, is automatically operated, respectively is operated by the clutch lever, said plate will be moved, according to the polarity of the brush contact inserted through the relative stick-like electrode couple, to the left or to the right, until the contact between the operated brush contact and the relative stick-like electrode couple is interrupted. This interruption takes place due to said air slit which is present between the opposite ends of the stick-like electrode couples. It is understood that the position of the five sliding bars, which are placed along a common straight line, being parallel to the surface of the plate and vertical to the longitudinal axis thereof, will be modified synchronously in the relative grooves. The extent of this synchronous modification corresponds to the extent of the modification of the electrodes with respect to the relative operated brush contact.

After said modification in the position of the sliding bars, said sliding bars will be always found in the sections of the contour line and of the four grooves, whereby this common positioning corresponds to a starting and disconnection position of the clutch of the accelerator pedal, i.e. of the desired speed.

Therefore, each one of the gear shift operations started from the electronic device takes place by closing the circuit connected to the relative brush contact; by realizing said contact the plate will be moved to the left, respectively to the right, and thus the relative position of the sliding bars is changed, so that said sliding bars will synchronously act onto the clutch, onto the movable gear wheels of the gear change as well as on the accelerator control rods.

As before said, the clutch pedal is not provided according to the present invention; therefore, before the electronic device inserts the first speed in the clutch lever position "forward", said clutch lever is moved gradually forward over the three contacts, provided by the first speed position (=forward). Said three positions, serving for the hand, as well as for the automatic control, are provided as to replace the action of the clutch pedal not provided in the servo-arrangement according to the present invention, for the starting of the vehicle. Obviously, the same procedure is also valid for the gradual positions of the reverse gear.

In this case it is important that the sliding bar operating on the acceleration acts onto the accelerator control rods and not directly onto the accelerator pedal. Between the accelerator pedal and the control rods thereof a spring element is inserted. By means of said spring element any intervention of the driver onto the acceleration while disconnecting the relative sliding bar, respectively while changing speed, is avoided.

Now, if the driver wants to operate the gear change directly by the clutch lever it is enough to switch over the selection switch from the position "automatic" to "hand gear shift". Thus the five electric conductions of the "forward-position" (automatic control) are disconnected and simultaneously those five electric conductions are inserted which are connected to the relative clutch lever positions corresponding to the five speeds.

The clutch lever position of the first speed corresponds to the clutch lever position "forward", whereby in this case the five conductions leading to the electronic device are excluded. Therefore, the control will be further operated electrically by the driver, but in this case directly by moving the clutch lever.

The functioning of the servo-arrangement is the same as hereinbefore described; the idle and the reverse gear are always electrically inserted and only by means of the clutch lever.

According to another embodiment of the present invention, the servo-arrangement according to the present invention may also be realized for the sole, hand operated control, in this case always by making use of a conventional gear change and by elimination of an electric conduction, so that the above described advantages are maintained.

Said variation takes place by mechanically connecting the clutch lever to a longitudinal plate, which may be slidingly moved—like a slide rule—in the longitudinal sense thereof, and is placed between two stick-like electrode couples placed side-by-side onto the toothed rod. Said toothed rod is operated exactly like the same rod in the first embodiment.

Two stick-like electrodes are placed on said longitudinal plate and are electrically insulated therefrom and parallel to the stick-like electrodes of the toothed rod, said electrodes being fed with current from a battery. The ends of said stick-like electrodes turned away from said battery are built stronger than the body of said electrodes.

When moving the clutch lever into a guide, provided parallel to the longitudinal axis of the vehicle, said clutch lever will gradually get into an electric contact with the seven side-by-side positions, whereby said positions correspond to the five relative speed positions, to the reverse and to the idle gear. As the clutch lever is mechanically connected to said sliding plate, both ends of the electrodes make possible a sliding contact with one of the electrode couples provided on the toothed rod—when moving said plate. By means of the connection—under reverse polarity—of said electrode couples to the electromotor, the toothed rod is shifted to the left, respectively to the right, until the contact is interrupted by the split provided between the opposite ends of both electrode couples. The moving of the clutch lever hereby corresponds to the moving of the toothed rod.

In this embodiment, too, a grooved plate is fixed to the toothed rod, said plate cooperating with the already described sliding bars, so that with each moving of the clutch lever the gear changes is simultaneously operated.

Finally, it is to be noted that in the plate, fixed to the clutch lever, a rectangular longitudinal slit is provided wherein a stop, fixed on the toothed rod, is engaging as to limit the maximal lateral moving of the plate.

The object of the present invention will be now described more in detail referring to the enclosed drawings, wherein the figures show:

FIG. 1 a schematic gear shift, wherein—for a better understanding—only one of the five conductions which connect the servo-arrangement to the electronic device is shown, as well as only one of the thirteen conductions which connect the clutch lever to the servo-arrangement;

FIG. 2 shows the gear shift according to FIG. 1, in an enlarged scale;

FIG. 3 is a top view, in enlarged scale, of the grooved plate and of the sliding bars being in cooperation with the relative grooves;

FIG. 4 is a section of a sliding bar, with a ball bearing and a small roller inserted in said ball bearing, whereby the small roller is in a sliding engagement with one groove of the plate;

FIG. 5 is a vertical section of the gear shift guide in the forward position, corresponding to the position "first speed";

FIG. 6 is a view similar to FIG. 5, the clutch lever being in the reverse gear position, whereby only one electric connection is needed;

FIG. 7 is a top view of another embodiment of the servo-arrangement according to the present invention, whereby the fixed brush contacts are replaced by stick-like electrode couples, which may slide one into the other;

FIG. 8 is a top view of the gear shift guide.

Figure 1:
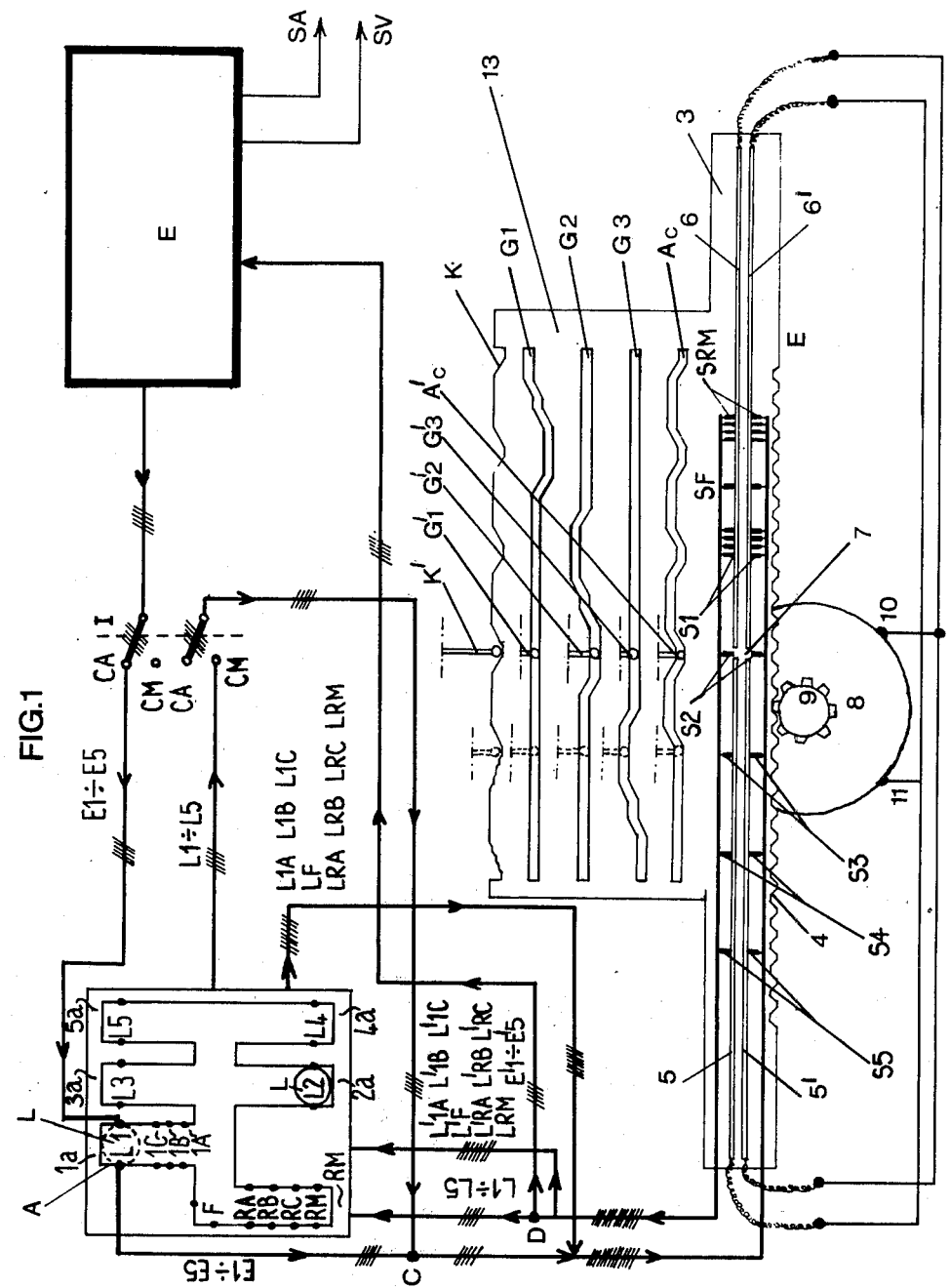

A double selecting switch I gives the driver the possibility or option to control the gear shift—according to his wishes—automatically, by means of an electronic device E, or by hand, by means of clutch level L. "Electronic" device E receives the information about speed variations of the vehicle and about the relative position of the accelerator pedal from two feelers SA, SV, not shown nor described in detail.

The positions which can be assumed by clutch lever L are shown in the drawings by 1a, . . . , 5a. Furthermore the idle gear is shown, in the drawings, with F, the gradual positions before the first speed are shown with 1A, 1B and 1C the gradual positions before the reverse gear are shown with RA, RB, RC, and the reverse gear is shown with RM. The clutch lever position in the first speed (hand control) is corresponds to the clutch lever position A (forward-automatic control). The clutch lever position A is connected to the electronic device E over five conductions, corresponding to the five speed positions 1A, . . . , 5a. All the other clutch positions are connected to the servo-arrangement over separate conductions, comprising the clutch lever position corresponding to the first speed (hand control), corresponding in turn to the forward position A (automatic control).

If the selection switch is in position CA (automatic), the five conductors connect cannot the five speed positions 1A, . . . , 5a of the clutch lever to the servo-arrangement (hand control) are disconnected, while the five conductors which connect the electronic device to the forward position A (automatic control) are inserted.

If the selection switch I is in position CM (hand control), the five electric conductors which connect the electronic device with the forward position are disconnected, while the five conductors which connect the five speed positions 1A, . . . , 5a to the servo-arrangement are inserted.

The conductions or conductors, which connect the clutch lever positions of the idle gear and of the gradual positions of the first speed 1A and of the reverse gear RM to the servo-arrangement, remain inserted, as these speed positions may be always separated only by means of the clutch lever.

The electric circuits provided both for the automatic and for the hand control are therefore separated in two groups, whereby each one of said groups is inserted, respectively disconnected, according to the gear shift choosen by the driver. A third group—for the operating of the idle gear and the gradual positions of the first speed, as well as the reverse gear, is always inserted.

In FIG. 1, the clutch lever is schematically shown in the forward position A (automatic control), corresponding to the position of the first speed 1A, as well as in the second speed position 2a (hand control).

E1, . . . , E5 show the five conductions—corresponding to the five speeds 1A, . . . , 5a—starting from electronic device E, and leading over selection switch I to forward position A, and from here to the servo-arrangement.

L1, . . . , L5 show five conductions—corresponding to five speed positions 1a, . . . , 5a—starting from the relative clutch lever postions and leading, over selection switch I, to the servo-arrangement.

LF; LRA; LRB; LRC; L1A, L1B, L1C show eight conductions, starting from the clutch lever position of the idle gear, respectively of the four gradual clutch lever positions of the reverse gear and of the three gradual clutch lever positions of the first speed 1a (respectively of the forward position), and leading to the servo-arrangement. These conductions lead directly to the servo-arrangement and are not connected to selection switch I. Conductions E1, . . . , E5, respectively L1, . . . , L5 always meet in a couple at C, whereby C is connected with double selection switch I.

E'1, . . . , E'5, respectively L'1, . . . , L'5 show the reverse conductions, starting from the servo-arrangement and meeting in a couple at D to prosecute—separately—, whereby conductions E'1, . . . , E'5 lead to the electronic device, and conductions L'1, . . . , L'5 lead to the relative clutch lever positions corresponding to the five speed positions 1a, . . . , 5a.

L'F; L'RA, L'RB, L'RC; L'1A, L'1B, L'1C show the reverse conductions leading from the servo-arrangement directly to the corresponding clutch lever positions.

From the described control, it is evident how selection switch I acts from the automatic control onto the hand control and vice versa, as well as that all the other conductions with the corresponding positions remain always inserted.

In FIGS. 1 and 2, 3 shows a rod out of resistant material, with a rectangular section, provided, at the lower part thereof, with a stops 4. On said rod 3 are placed, insulated from the same, two long stick-like electrode couples 5, 5'; 6, 6'—which are placed side-by-side, and between said electrode couples an air slit 7 is provided. Below rod 3 an electromotor 8 is placed, being provided with a not shown reduction gear and with a gear wheel 9. Gear wheel 9 is engaged with one of the stops 4 of rod 3. The free ends of stick-like electrodes 5, 5'; 6, 6' are connected —under reverse polarity—to the terminals 10, 11 of the electromotor 8 in such a way, that upper electrode 5 of one electrode couple is connected with lower electrode 6' of the other electrode couple to the same terminal 11, and that upper electrode 6 of one electrode couple is connected with lower electrode 5' to the same terminal 10.

Along one side of each electrode 5, 5'; 6, 6' as many brush contacts are provided as there are conductors provided, and each one of the conductors corresponds to one of the five speeds 1a, . . . , 5a (five), the idle gear position (one), the four gradual positions of the reverse gear (four) and the three gradual positions of the first speed 1a (three) (hand control), respectively to the forward position (automatic control).

Therefore, thirteen different brush contacts are provided, being shown in FIG. 1 with S1, . . . , S5; S1A, S1B, S1C, SRA, SRB, SRC, SRM and SF. Said brush contacts are fixed onto a support independent from rod 3, so that between electrodes 5, 5'; 6, 6' fixed to the rod and the brush contacts a relative movement is possible, and therefore also sliding contacts.

The terminals of each brush contact are, as already said, inserted relatively over conductions E1, . . . , E5; L1, . . . , L5; L1A, L1B, L1C, LRA, LRB, LRC, LRM, LF, respectively over conductions E'1, . . . , E'5; L'1, . . , L'5; L'A, L'B, L'C; L'RA, L'RB, L'RC, L'RM; L'F in the control disposition, and thus connect the servoarrangement to the relative clutch lever positions in the case of an automatic, as well as of a hand control.

A rectangular plate 13, extending vertically from the upper side of rod 3 and made out of one piece with the same, respectively tightly connected thereto, out of resistant material, the longitudinal axis thereof being parallel to the longitudinal axis of rod 3. Plate 13 is placed nearly at the centre of rod 3 and said plate is slightly longer then half the length of the rod.

A contour line K, being predetermined in the shape thereof, is cut in the upper edge of plate 13; four grooves Ac, G1, G2 and G3; these are cut into plate 13 and are parallel to contour line K in said plate 13 but with different configurations. Contour line K as well as the four shaped grooves G1, G2, G3 and Ac initially have a first straight section parallel to the longitudinal axis of plate 13, with different undulating portions which vary by going into upwards, respectively downwards inclined, respectively again parallel sections of different length.

As can be seen from FIG. 1, sliding bars K'; G'1, . . . , G'3; A'c slide on contour line K and within the four grooves G1, . . . , C3; Ac. For this purpose said five sliding bars show, at the free ends 14 thereof, a small roller 15, being inserted in a ball bearing 16 in such a way, that small roller 15 and the corresponding sliding bar are placed at 90° with respect one to another (FIG. 4). Said five sliding bars are placed along a common straight line, being parallel to the surface of plate 13 and vertical to the longitudinal axis thereof, so that with each moving of rod 3, connected to plate 13, by electromotor 8, a synchronous moving of bars K'; G'1, . . . , G'3; A'c takes place. Said sliding bars K'; G'1, . . . , G'3; A'c are connected, with the opposite ends thereof, over levers and articulated connections, to the clutch, to the three movable gear wheels of the gear change and to the accelerator control rods, so that, with each moving of plate 13 by the different positioning of the sliding bars on contour line K and in grooves G1, . . . , G3; Ac a corresponding starting of the gear shift takes place. These different positions of the sliding bars when moving plate 13, are shown in FIG. 3 respectively P1, . . . , P5 (speeds 1a, . . . , 5a); P1A, P1B, P1C (three gradual positions of first speed 1a, respectively of forward position A); PRA, PRB, PRC, PRM (four gradual positions of the reverse gear); and PF (idle gear).

The functioning of the servo-arrangement according to the present invention will be now described more in detail, in the case of a switch over from the first to the second speed. Selection switch I is, in this case, on position CA (automatic control). The first speed being inserted, the four brush contacts S1A, S1B, S1C, S1 are found in the air slit between the opposite ends of the electrodes. As soon as the electronic device supplies the information for the gear shift, into the second speed, said information is led, through conduction E2, to clutch position A, and from there to brush contact S2. The current flows through electrodes 5, 5' to terminals 10, 11 of electromotor 8 which—in turn—moves, through gear wheel 9 and toothed section 4, the rod to the left until the sliding contact is interrupted by air slit 7. In this moment the current supply will be interrupted, the electromotor stops and plate 13 rests. In the moving of plate 13 of the the section between brush contacts S1, S1A, S1B, SIC and brush contact S2, sliding K'; G'1, . . , G'3; A'c have been forced to change the position thereof on shaped contour line K and in shaped grooves G1, . . . , G3; Ac, as follows:

(1) sliding bar is located, before starting, on the straight section of contour line K, corresponding to the inserted clutch position of the first speed. When switching over into the second speed plate 13 moves to the left. Sliding bar K' slides upward, to the right, over the attached, straight section, disconnecting the clutch and placing itself onto the lower section— shown by P2—, whereby the clutch is inserted for the second speed.

(2) Sliding bar G'1, connected with the movable gear wheel of the gear change, which determines the insertion, respectively the disconnecting of the fourth and fifth speed, slidingly moves, in this case, of the same section to the right, over the straight section. The relative position thereof is not changed, as the fourth and fifth speed remain disconnected.

(3) Sliding bar G'2, connected with the movable gear wheel for implementing a gear change now controls the insertion, respectively and the disconnection of the second and third speed, and also slidingly moves the same section to the left, moving away from that section with which the second speed is disconnected, onto below section P2 with which the second speed is inserted.

(4) Sliding bar G'3, connected with the movable gear wheel of the gear change, which determines the insertion, respectively the disconnection of the reverse gear and the first speed, slidingly moves the same section to the right, away from that section with which the first speed is inserted, onto the next lower section, with which the reverse gear in inserted.

(5) Sliding bar A'c, which determines the insertion, respectively the disconnection of the accelerator control rods, slidingly moves upward of the same section over the subsequent section, transiently disengages the accelerator pedal from the accelerator control rods and then places itself onto the next lower section, with which the accelerator pedal can be engaged again.

All of the sliding bars are therefore moved from the cross-hatched (dark-dot-dash line) position of FIG. 1 (first speed) into the position of FIG. 1 (second speed) drawn in full lines.

If the selection switch I is placed on CM (hand control) any action of the electronic device is disconnected. Clutch lever L is now able to directly operate the gear shift contacts of the five speeds 1a, . . . , 5a in the same way as by means of the electronic device.

Referring now more particularly to FIG. 2 which shows in detail the wiring diagram and various electrical interconnections, the electronic device E is responsive to feelers $S_A$ and $S_V$ and selector switch I is shown connected in its automatic position CA in the forward direction.

A plurality of electric conductions or conductors for providing an electric connection between the clutch L (or shift control means) and the servo-arrangement is shown; in both cases, the control of the gear change is performed either by hand or automatically and the conductions or conductors LRA, LRB, and LRC and LRM, the gradual reverse gear positions of RA, RB, RC and RM which are controlled, respectively controlled by electronic control E. Further, conductions or conductors LIA, LIB and LIC which correspond to the gradual positions of 1A, 1B and 1C for inserting the first speed by means of the hand operation control and for connecting the same to the corresponding sliding contacts SIA, SIB and SIC of the servo-arrangement, respectively. One selection switch I (FIG. 1) which has two positions to which the conductions or conductors E1-E5 and L-L5 are connected, and which are connected in such a way moreover that control may be switched over from manual control to the automatic control or vice-versa from manual to automatic control to allow the gear change to be operated automatically by the electronic control device E by using the combinations E1-E5 or manually by using the conductors or conductions L-L5.

Further, the various detailed circuit connections are shown in FIG. 2 so that a complete operative circuit diagram for all of the electrical connections is shown.

According to another embodiment of the present invention (FIG. 7) the servo-arrangement can be realized in such a way that the gear shift may take place only by operating of the clutch lever eliminating all electric conductions, still maintaining all the advantages of above said embodiment. In this case, clutch lever L is in a direct fixed connection to a longitudinal plate 18, said plate being longitudinally sliding movable between two stick-like electrode-couples 25, 25'; 26, 26' placed side-by-side on toothed rod 3', like a slide rule, whereby toothed rod 3' is operated exactly in the same way as rod 3 of the first embodiment.

On said longitudinal plate 18 are placed, insulated therefrom and parallel to stick-like electrodes 25, 25'; 26, 26', stick-like electrodes 19, 19' which are fed by a battery B with current. The ends 21, 21' of said sticklike electrodes, which are turned away from the battery, are stronger than the bodies of said electrodes.

When moving the clutch lever in a guide provided parallel to the longitudinal axis of the vehicle, said clutch lever will gradually get into electrical contact with seven side-by-side placed positions (FIG. 8), corresponding each to the five speed positions 1a, ..., 5A, to the reverse gear and to the idler gear. As the clutch lever is mechanically connected to sliding plate 18, both ends 21, 21' of the electrodes will make possible a sliding contact—when moving said plate—with each one of the electrode couples placed on toothed rod 3'. By means of the contact—under reverse polarity—of said electrode couples 25, 25'; 26, 26' to electromotor 8 toothed rod is moved to the left, respectively to the right until the contact is interrupted by air slit 7', provided between the opposite ends of both electrode couples 25, 25'; 26, 26'. The moving of the clutch lever corresponds—in this case—to the moving of the toothed rod.

Also in this embodiment a grooved plate 13' is in a fixed connection with toothed rod 3', said rod being in cooperation with above described sliding rolls, so that with each moving of clutch lever L also the gear change is operated.

Finally it is to be noted that in plate 18 fixedly connected with the clutch lever, a rectangular longitudinal slit is provided, in which a stop 23, provided on toothed bar 3', engages, which limits the maximal moving of the plate.

The object of the present invention has been described relating to preferred embodiments thereof; it is evident that the dispositions as well as the dimensions may be modified, without therefore going out of the limits of the present invention.

Bar 3, as well as the cooperating elements and the plate may receive, e.g., a cylindrical shape. The dimensions of the servo-arrangement may also be smaller, i.e. more bulky, and the moving of the sliding bars may be stronger transmitted onto the gear change by means of appropriate levers.

The servo-arrangement can also be used for operating a gear shift provided with a reduction gear. In this case, a further groove must be cut into plate 13.

What I claim, is:

1. A servo-arrangement for automatically controlling a transmission including a transmission control selector having a manual override control to provide for automatic or manual selection control, said transmission having at least a gear changing clutch mechanism, three movable gear wheels forming part of said gear changing clutch mechanism and accellerator control rods, said servo-arrangement comprising:

a rod unit including a rod formed from resistant material and having a rectangular cross-section, said rod unit including on a lower side of said rod a toothed section and on an upper side thereof a rectangular plate, said rectuangular section of said rod having a longitudinal axis parallel to the longitudinal axis of said rod, and the length of said rectangular section being nearly the same length as said rod;

two electrode units extending longitudinally along said rod, said electrode units being coupled to said rod but insulated therefrom, each of said electrode units having a longitudinal slit to divide said electrode units into a pair of electrodes for each said electrode unit on each side of said slit;

the upper edge of said rectangular plate having a surface with a contoured configuration of a predetermined shape, and said plate having four longitudinally extending grooves substantially parallel to the upper edge of said plate, each of said grooves also having a surface with a contoured configuration of a predetermined shape, and said upper surface with contoured configuration being the relative control for said gear changing clutch mechanism, three of said grooves with the contoured configuration surface being the relative control for said movable gear wheels, and the fourth of said four grooves being the relative control for said accelerator rods;

a plurality of sliding bars each having roller means at one end adapted to ride on one of said surfaces of contoured configuration, one of said sliding bars having its said other end connected to said gear changing clutch mechanism bar and being operatively associated through its said roller means with the upper surface of said rectangular plate, three others of said plurality of bars each having its said other end thereof respectively connected with one of said movable gear wheels with its said associated roller means adapted to ride in its respective first, second or third groove, and a fourth other bar having its said other end connected with said accelerator rods and its said one end with its said associated roller means adapted to ride in said fourth groove on its said contoured surface configuration;

an electromotor having a pair of terminals connected to said electrode units and to provide for a polarity reversal for each said pair of electrodes such that the polarity of each said electrode of each said electrode unit is the opposite on opposite sides of said slit, said electromotor including a reduction gear wheel in contact with said toothed section of said rod; and a plurality of electrical contacts fixed relative to said rod, said contacts being placed along one side of said electrode units and being electrically connected therewith and with said controls from said manual control and said automatic control to provide for each one of the gear shift operations of said transmission so that the controls act on said sliding bars and not directly on the items being controlled to change speeds or to change direction from forward motion to reverse motion and vice-versa.

2. A servo-arrangement according to claim 1, wherein said plurality electrical contacts fixed relative to electrode units, includes electrodes insulated from said bar and fixed thereto, said electrodes being directly fed by a battery, said rod being mechanically connected to said transmission control selector, and said transmission control selector being movable straight and parallel to the longitudinal axis of the vehicle, forward and backward, according to seven different positions of said transmission control selector corresponding to speed positions.

3. A servo-arrangement according to claim 2, wherein said transmission control selector includes a lever associated with said rod, said electromotor being operative to move said rod either to the left or to the right corresponding to the displacement of said lever, a contact on one of the electrodes of each of said electrode units; and a stop on said rod unit to limit the maximum movement thereof and engageable with said contacts on said electrodes.

4. A gear shift according to claim 1, wherein said plurality of electrical contacts includes:

a plurality of sliding contacts, an electronic device responsive to feelers connected thereto by means of shifting conductions for supplying shifting information about the different positions of the accelerator pedal speed variations of the vehicle;

five relative speed electric conductions corresponding to different relative speeds, said conductions connecting said electronic device to a first shifting position of said transmission, said transmission in the first shifting position controls the driving direction "forward," and said conductions are connected to up to five of said sliding contacts, with a different speed for each one of these sliding contacts;

five electric conductions or connectors, one for each said speed, starting from one of the speeds of said manual override control connected to one of said relative sliding contacts, wherein the automatic control position of said transmission control selector corresponding to the first speed corresponds to the general position "forward," and in this position the transmission control selector is placed at the servo-arrangement to pass on the information obtained from said electronic device by means of said relative speed conductions, said transmission being separately connected to said servo-arrangement;

eight electric conductions producing between said transmission control selector and the servo-arrangement, an electric connection, in both cases being the control of the gear change performed manually or automatically, and said eight conductions are grouped as follows:

four conductions connected between the starting control of said transmission control and connecting the reverse gears to the sliding contacts for the reverse gears of the servo-arrangement;

three conductions connected between the relative gradual positions of said transmission control selector for the insertion of the first speed by manual operation, and connecting the same to the sliding contacts of the first speed of the servo arrangement; and said transmission control selector includes one selection switch with two positions for switching between said manual override control to provide for manual or hand control of said sliding bars.

5. A servo-arrangement according to claim 1, wherein the contoured configuration of the upper edge of said plate and the surfaces of said grooves comprises:

a first, straight section going over into an upwardly and downwardly inclined, respectively straight sections, the length and the respective position of these sections being chosen in such a way that the relative predetermined positions of said sliding bars corresponding to each speed.

6. A servo-arrangement according to claim 1, wherein said sliding bars are respectively mechanically connected to said gear changing clutch mechanisms, said movable gear wheels of the gear change and said accelerator control rods, the roll means of said sliding bars being extended along a common straight line parallel to the surface of said rectangular plate, and vertical to the longitudinal axis thereof, in such a way that the position of said sliding bars and said roll means in the relative grooves is respectively synchronously shifted, when said plate is moved by said electromotor to the left or to the right.

7. A servo-arrangement according to claim 6, including a ball bearing placed on the inner side of the free end of each said sliding bar and at a 90° angle to each said roller means, each said roller means being coupled to said ball bearing.

8. A servo-arrangement according to claim 7, wherein said terminals are connected to said electrode units;

one of said units including first and second upper electrodes and the other of said electrode units including first and second lower electrodes, each said first and each said second electrodes forming an electrode couple; and said upper electrode of one said electrode couples and said lower electrode of the other of said electrode couples being connected to one and the same terminal of said electromotor, and the upper electrode of said other electrode couple and the lower electrode of the one electrode couple being connected to one and the same terminal, but different from said last-mentioned terminal.

9. A servo-arrangement according to claim 1, wherein
the electrodes of each said electrode units on the same side of said slit form an electrode couple,
said terminals being connected to said one electrode couple on one side of said slit and being connected to said other electrode couple on the other side of said slit so that the same terminal of said pair of terminals is connected to different electrode units on opposite sides of said slit.

10. A servo-arrangement according to claim 9, wherein
the same plurality of sliding contacts for each said electrode couple are fixed to said rod;
said sliding contacts are fixed on a support independent from said rod, and moving said electrode couples fixed onto said rod to the left or to the right of said slit must not reach beyond the position of the last of said sliding contacts.

11. A servo-arrangement according to claim 4, wherein
said relative speed electric conductions for the automatic control of the transmission, are connected from said electronic device through said selection switch through said transmission control selector to said sliding contacts, and from said sliding contacts in return to said electronic device.

12. A servo-arrangement according to claim 4, wherein
said relative speed for the hand control of the transmission control selector gear change electric conductions are connected through the terminals of said selection switch to said sliding contacts, and then through said five electric conductions for connecting said sliding contacts to the position of one of the relative speeds while separate electric conductions connect the different gears of said transmission control selector to different terminals of said selection switch.

13. A servo-arrangement according to claim 4, including
electric conductions for each different gear in said transmission for connection under automatic and manual control, and a separate sliding contact for each said different gear in said transmission for each said last-mentioned electric conductions.

14. A servo-arrangement according to claim 4, including
a selector selection switch which includes two positions for automatic control and two positions for manual control, one of said two positions of said automatic control connects said electronic device with said sliding contacts and the other of said two positions of said automatic control deactivates the controls from said manual control, and one of said positions of the manual control decouples said electronic device and the other of said positions of said manual control couples connects said sliding contacts with the transmission gear selector.

15. A servo-arrangement as claimed in claim 14, including
a plurality of connections coupled between said manual control override and said sliding contacts free of connection through said selector switch.

16. A servo-arrangement according to claim 4, wherein, when closing each circuit the current flows to the relative sliding contacts and from there to said electrode units and to said electromotor, wherein, according to the sliding contact fed with current, said rod and said plate either moves to the left or to the right, so that said sliding bars which are mechanically connected to the gear changing clutch mechanism, to the movable gear wheels of the gear changing clutch mechanism and to the accelerator control rods, are displaced by this same length and set on the relative speed position.

* * * * *

UNITED STATES PATENT AND TRADEMARK OFFICE
CERTIFICATE OF CORRECTION

PATENT NO. : 4,280,604

DATED : July 28, 1981

INVENTOR(S) : Rocco LAMBICCO

It is certified that error appears in the above—identified patent and that said Letters Patent is hereby corrected as shown below:

Col. 1, Lines 17 and 18, "so to" should be --so as to--;

Col. 1, Line 39, "breakes" should be --brakes--;

Col. 4, Line 8, "independant" should be --independent--;

Col. 4, Line 68, "respectevely" should be --respectively--;

Col. 6, Line 58, "Fig. 1 a" should be --Fig. 1 is a--;

Col. 7, Line 43, "connect cannot" should be --which connect--.

Col. 8, Line 12, "LRA;LRB" should be --LRA,LRB--; and "LRB;LRC" should be --LRB,LRC--;

Col. 9, Line 31, "C3" should be --G3--;

UNITED STATES PATENT AND TRADEMARK OFFICE
CERTIFICATE OF CORRECTION

PATENT NO. : 4,280,604

DATED : July 28, 1981

INVENTOR(S) : Rocco LAMBICCO

It is certified that error appears in the above—identified patent and that said Letters Patent is hereby corrected as shown below:

Col. 10, Line 50, "(dark-dot-dash line)" should be --(dash-dot-dash line)--;

Col. 12, (Claim 1) Line 22, "accellerator" should be --accelerator--;

Col. 12, (Claim 1) Line 28, "rectuangular"(second occurrence) should be --rectangular--;

Col. 13, (Claim 4) Line 58, "these sliding" should be --these said sliding--.

Signed and Sealed this

Third Day of August 1982

[SEAL]

Attest:

Attesting Officer

GERALD J. MOSSINGHOFF

Commissioner of Patents and Trademarks